Dec. 16, 1952 — T. W. HARRIS ET AL — 2,621,626
INFLATION FOR MILKING MACHINES
Filed May 25, 1950 — 2 SHEETS—SHEET 1
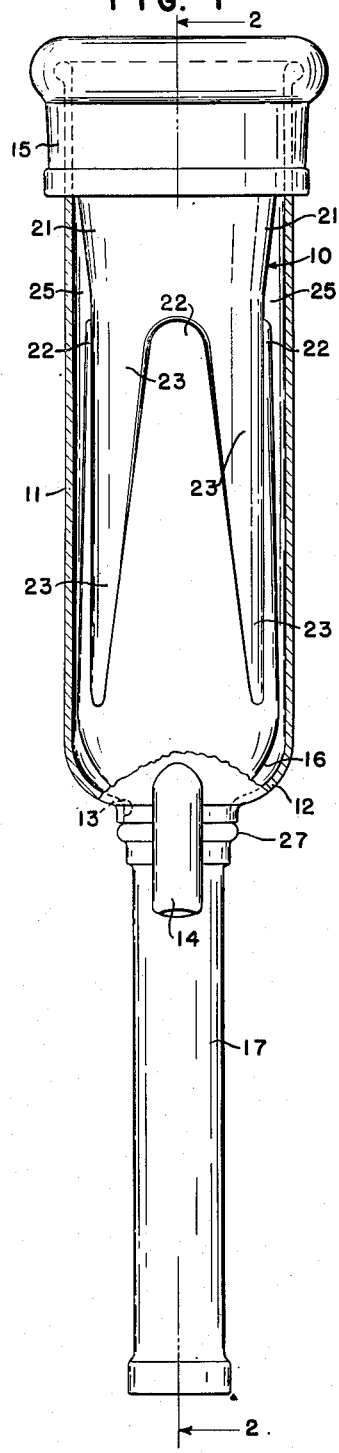
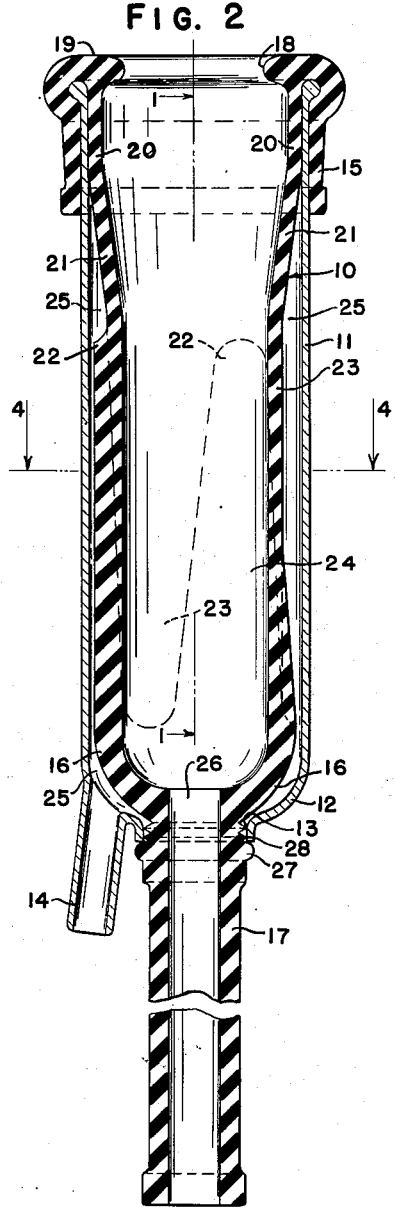
THEODORE W. HARRIS AND
ROYAL B. INGERSOLL
INVENTORS
BY
Theodore E. Simonton Dec. 16, 1952     T. W. HARRIS ET AL     2,621,626
INFLATION FOR MILKING MACHINES
Filed May 25, 1950     2 SHEETS—SHEET 2
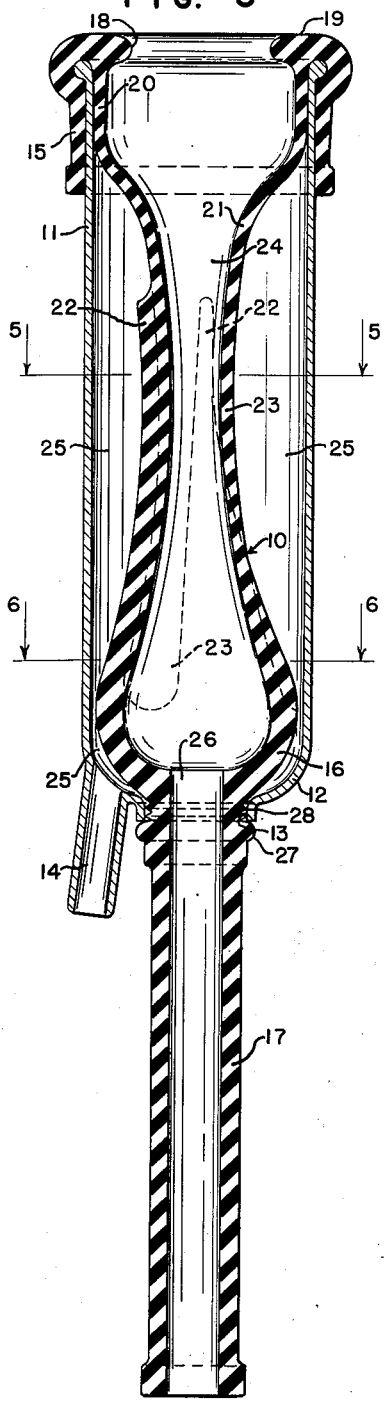
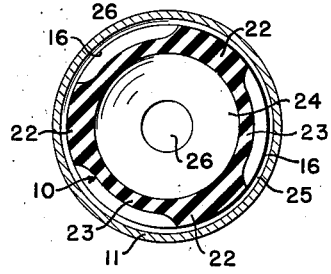
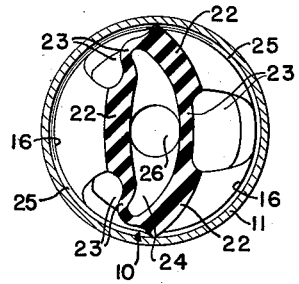
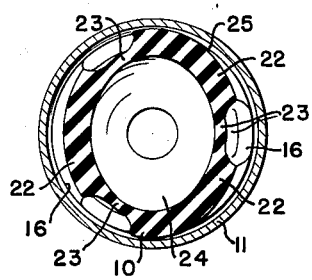
THEODORE W. HARRIS AND
ROYAL B. INGERSOLL
*INVENTORS*
BY
*Theodore L. Simonton*

Patented Dec. 16, 1952

2,621,626

UNITED STATES PATENT OFFICE 2,621,626

INFLATION FOR MILKING MACHINES

Theodore W. Harris, Indianapolis, Ind., and Royal B. Ingersoll, Oneida, N. Y., assignors to Hinman Milking Machine Co., Inc., Oneida, N. Y., a corporation of New York Application May 25, 1950, Serial No. 164,178

2 Claims. (Cl. 119—14.52)

This invention relates to inflations for milking machines and more particularly to inflations for use with a cylindrical metal teat cup.

The extraction of milk from the udder of the cow in all milking machines is effected by the use of cup-shaped rubber inflations fitted over the teats of the cow. Usually these inflations are employed in conjunction with a metal teat cup, a constant partial vacuum being maintained within the inflation, and the space between the exterior of the inflation and the metal cup being subjected to pulsations of pressure. These pulsations usually alternate between a partial vacuum at least equal to that within the inflation, and a pressure substantially equal to atmospheric pressure. The constant partial vacuum serves to draw the teat well down into the interior of the inflation, to hold the inflation and associated teat cup in position about the teat, and to extract the milk from the teat by a gentle suction similar to that of a calf nursing. The pulsations of alternately high and low pressure about the exterior of the inflation, collapse the flexible rubber inflation about the teat at high pressure, and when the exterior pressure is reduced substantially to that in the interior, allow the inflation to dilate by reason of the natural resiliency of the rubber causing the inflation to resume its original shape. This alternate collapse and dilation of the inflation produces a milking action similar to hand milking or to the massaging action of a calf at suck.

The massage produced by the alternate collapse and dilation of the inflation is most efficient when the collapse of the inflation occurs first at a point near to the udder of the cow and progresses downward in the manner of a human hand in expert hand milking. The milk is trapped in the teat by the initial collapse at a point high upon the teat near the udder and the pressure progressing downward around the teat below this point forces the milk out of the teat canal. Failure to induce progressive collapse from top to bottom of the inflation results in a slower milking time due to a portion of the milk in the teat being forced back up into the udder rather than down and out through the meatus, the opening of the teat canal to the outside. This condition is similar to that when an inexpert milker attempts hand milking.

Inflations heretofore used in conjunction with a metal teat cup have customarily been either substantially cylindrical in shape or slightly tapered or cone shaped. Inflations have been made both of the one-piece type with top and bottom adapted for sealed engagement with the top and bottom, respectively, of the teat cup; and of the multiple type where sealing of the inflation at top and bottom to the teat cup is accomplished by use of additional parts, usually of rubber. Glove type inflations have walls comparatively thin and flexible and are designed to fit closely about the teat like a glove.

Some attempt, in the past, has been made to control the cross-sectional pattern of the collapsed inflation by the addition of reinforcing ribs. Other inflations have a comparatively thin wall at the top tapering to a thick wall at the bottom, in an attempt to induce the progressive collapse of the inflation from top to bottom.

Inflations of this latter type have the disadvantage of having a constricted interior teat-containing space adjacent the lower end of the teat, due to the tapered wall. This disadvantage is serious because of possible contact of the meatus or discharge end of the milk canal of the cow's teat, when subjected to suction, with the inside wall of the inflation. Irritation of the meatus, with consequent danger of infection, results when the inflation wall comes in contact with the meatus, due to insufficient room for the teat or to the collapsing of the inflation near the bottom. This danger of irritation is most prevalent when glove type inflations or inflations with tapered interiors are used. Inasmuch as it is impractical to provide inflations of varying length for cows with long or short teats, it has been a difficult matter heretofore to provide an inflation giving protection to the meatus and still to provide the maximum massaging action by progressive collapse of the inflation to force out the entire milk content of the teat.

A further difficulty, experienced particularly with inflations of the one-piece type, has been the difficulty in sealing the ends of the inflation about the teat cup, particularly the upper end. As the upper portion of the inflation is collapsed, the inflation wall is pulled away from the teat cup wall, resulting in leaks which interfere with exhausting the air about the exterior of the inflation. This results in failure to equalize interior and exterior pressures, and the inflation may not dilate sufficiently to allow the teat to again completely fill with milk.

The object of the present invention is to provide an inflation so constructed for desirable milking action as to initially collapse at a point near the top of the inflation, and thereafter collapse progressively along the inflation toward the lower end of the inflation as the difference between the pressures on the exterior and interior portions of the inflation becomes greater.

A further object is to provide an inflation which will collapse to only a very small degree at its lower portion, thus preventing any contact between the walls of the inflation and the meatus.

A still further object is to provide an inflation with improved seals between the ends of the inflation and the wall of the teat cup.

The improved inflation which is the subject of the present invention is generally cup-shaped. To provide the aforesaid desired downwardly progressive collapsing action, exterior reinforcing ribs of substantially uniform thickness are provided, molded integrally with the outside of the inflation and extending longitudinally of the inflation with each rib tapering in width from a wide bottom to a narrow top. This provides an inflation which is progressively stiffer toward its bottom, without narrowing the teat-containing space in the inflation. Another feature is that the normal diameter of the cylindrical side wall at the top of the inflation is of greater diameter than the teat cup into which it fits. This results in the rubber at the upper end of the inflation being under compression when assembled to the teat cup, insuring an air-tight seal between inflation and cup. A still further feature is the addition of wedge-shaped annular beads about the inflation, cooperating with the lower end of the teat cup, resulting in more efficient sealing of cup and inflation at that end.

A preferred embodiment of the present invention is shown in the accompanying drawings, in which:

Figure 1 is a side elevational view of our improved inflation in normal or dilated position, together with an associated teat cup, the latter being partly in section on the line 1—1 of Figure 2;

Figure 2 is a sectional view thereof on the line 2—2 of Figure 1;

Figure 3 is a similar sectional view showing the inflation collapsed;

Figure 4 is a sectional view of the dilated inflation of Figure 2 on the line 4—4 thereof;

Figure 5 is a sectional view of the collapsed inflation of Figure 3 on the line 5—5 thereof; and Figure 6 is a sectional view of the collapsed inflation of Figure 3 on line 6—6 thereof.

Referring now more in detail to Figures 1 and 2 of the drawings, the inflation 10 is of molded soft rubber and is adapted to be used with a cylindrical metal teat cup 11 of conventional design.

Teat cup 11 is open at the top and has a rounded bottom 12 formed with a central pendent nipple or orifice 13. There is also provided a nipple 14 for connection with the pulsator.

The inflation 10 is substantially cup-shaped, having joined thereto, at the top, the conventional rim flap 15 and, at the bottom 16, the hose-like, milk tube 17 to which may be attached the hose from the vacuum and milk pail. The top of inflation 10 is open to allow the introduction of the teat and the integral rim flap 15 folds back over the metal teat cup 11 in the usual manner, the flap 15 being normally of slightly smaller diameter than the teat cup 11. A smoothly rounded and beveled internal annular projection 18 is provided at the junction of flap 15 with the inflation 10, so that a comparatively broad flat surface 19 is present at the top of the inflation against which the top of the teat at its junction with the udder may be held by the suction of the partial vacuum to which the interior of the inflation is subjected.

The interior, cup-engaging wall of the inflation at 20 under the rim flap 15 is formed so that its normal outside diameter is slightly greater than the inside diameter of the teat cup 13. Approximately one inch below the top of the inflation and below this cup-engaging portion 20 underlying the rim flap 15, the inflation is tapered inwardly and downwardly at 21 to the tops of the reinforcing ribs 22.

The three ribs 22 are of substantially uniform thickness and are molded integrally with the inflation and thicken the sidewall thereof. Ribs 22 are formed on the exterior of the inflation, are of equal length and extend longitudinally of the inflation in symmetrical arrangement, with each rib tapering in width from the bottom 16 of the inflation, where the ribs are of such width as to form a continuous band around the inflation, to the top of the rib which is comparatively narrow. The width of the ribs at their top is less than the width of the unthickened portions 23 of the side wall of the inflation between the ribs. The length of the ribs is such that they thicken the inflation from its bottom upward for the major portion of the length of the inflation, the upper ends of the ribs preferably extending at least to within approximately two inches of the top of the inflation 10.

The teat-containing interior 24 of the inflation is normally cylindrical from the bottom 16 up to the tops of ribs 22. Above ribs 22, the sidewall of the inflation at 21 flares outwardly and upwardly to the cup-engaging portion 20. Ribs 22 project from the exterior of the inflation and, due to the flaring portion at 21, may be of such thickness as to normally be readily contained within teat cup 11 without contacting the walls of the cup.

The teat-containing interior 24 of the inflation has a diametrical measurement at the top, across the internal annular projection 18, amply sufficient to admit the teat of a cow. At the cup-contacting portion 20 this measurement is larger, gradually decreasing at 21 downward to the tops of ribs 22 where the measurement is substantially that of the top. This interior 24 may be approximately 5¾ inches in length.

The bottom 16 of the inflation has a slightly smaller outside diameter than the interior of the teat cup and thus affords ample passageway for the exhausting of air from the space 25 between teat cup 11 and inflation 10 through the nipple 14. Bottom 16 is rounded and has a centrally located milk outlet 26 therethrough connected to the passage through the milk hose 17 which is preferably formed integrally with the inflation. Milk hose 17 is adapted to be drawn through the orifice of nipple 13 at the bottom of teat cup 11.

The bottom 16 of the inflation has an exterior annular retaining bead 27 therearound at the junction of inflation 10 and milk hose 17. Bead 27 is of slightly larger diameter than orifice 13 so as to be adapted to retain and seal the inflation at its lower end in well-known manner to the teat cup 11. The inflation is of such length as to be under a slight longitudinal tension when assembled to the teat cup with bead 27 drawn and forced through the orifice of nipple 13. Additional annular sealing beads 28, wedge-shaped in cross-section, are provided just above bead 27 where the bottom 16 of the inflation contacts the teat cup 11 adjacent the nipple 13. Beads 28 are slightly larger in diameter than the internal diameter of nipple 13 so as to be compressed when bead 27 is drawn through the nipple 13.

When the inflation 10 and cup 11 are in use, the milk tube 17 is connected to the milk pail subjecting the teat-containing interior 24 of the inflation to a constant partial vacuum. Nipple 14 is connected to the pulsator which alternately exhausts the air from the space 25 between teat cup 11 and inflation 10, and exposes such space to atmospheric pressure.

In operation, when the pulsating pressure to which the exterior space 25 is subject equals substantially that of atmosphere, the inflation 10 is collapsed in a pattern such as shown in Figures 3, 5 and 6. When the pressure in exterior space 25 is substantially equal to that in the interior space 24, the inflation assumes the normal shape shown in Figures 1, 2 and 4.

It has been found that the cross-sectional pattern of collapse induced by the construction shown is substantially that of Figure 5. One of the ribs 22 is pushed inward toward the opposite wall and flexion of the side wall is sharpest at the thin portions 23 on either side of this rib 22. The other two ribs 22 are similarly pushed in toward the first rib 22.

More important, however, is the fact that the thin portion of the side wall at 21 above ribs 22 is initially collapsed. As the exterior pressure increases over that of the interior, the relatively thin side wall of the top portion 21 between the cup-contacting portion 20 and the narrow upper ends of ribs 22, is squashed together in a manner as if one stepped on an ordinary rubber tube. The opposite sides of the side wall do not actually touch one another but approach one another closely before there is any comparable collapse of the reinforced portion of the side wall lower down along ribs 22.

As the exterior pressure is increased, the reinforced side walls along ribs 22 also collapse in the manner shown in Figure 5. While the most constricted portion of the inflation is initially at some point above ribs 22, this area of most constriction progresses downward as the exterior pressure is increased until it is substantially at the line 5—5, shown in Figure 3.

The side wall around the bottom 16, being substantially of the same thickness as the ribs 22, resists the collapse induced by the unequal outside and inside pressures. This, it has been found, induces the partial collapse of the lower portion to a pattern similar to that shown in Figure 6. The ribs 22, being wider nearer the bottom of the inflation, prevent any transverse squashing of the inflation such as shown in Figure 5. In this manner, the constriction of the lower side walls of the inflation is restricted so that any contact of the inflation with the meatus of the cow's teat is prevented.

It will be apparent that the milking action of the above-described sequence of collapse will be similar to that obtained in hand milking. The initial collapse of the inflation at a point above the ribs 22 traps the milk in the teat of the cow. Subsequent collapse of the inflation is from this point downward, forcing the milk out of the teat assisted by the sucking action of the partial vacuum in the interior 24. While the opposite sides of the collapsed wall do not actually touch, they approach one another sufficiently to completely constrict the enclosed teat.

While some attempts in the past have been made to control the pattern of collapse of inflations by the use of reinforcing ribs, the ribs 22 of the present invention control not only the pattern of collapse but also the sequence of collapse. It is only near the bottom of the inflation that the cross-sectional shape of the pattern is important. The fact that the collapsed inflation assumes a shape substantially oval in cross-section is incidental to the reinforcing of this bottom portion to prevent contact of the inflation with the meatus. Control of the collapse of the inflation is obtained by the ribs 22, however, in the sequence of the collapse. Progressive collapse of the inflation from top to bottom is obtained by the presence of the ribs shaped as hereinabove described. The sequence of collapse paralleling that of the hand in hand-milking increases the efficiency of milking machines equipped with the present invention. It has been found that milking time is lessened, the necessity for subsequent hand-stripping in many cases is virtually eliminated and irritation of the meatus is prevented.

The operating efficiency of the hereindescribed inflation may be attributed to the sequence of collapse, as described above, and also to the initial constriction being at a point relatively high up in the inflation. The tapered ribs 22 strengthen the wall of the inflation near the bottom 25 and strengthen the side wall in decreasing degree thereabove along the length of the rib. The comparatively greater flexibility of that portion of the side wall at 21, above the ribs 22, may be said to induce this relatively high initial collapse.

This portion of the side wall at 21 being so near the upper end of the teat cup, however, makes it highly desirable that a more than usually efficient seal between inflation 10 and the wall of teat cup 11 be made at this upper end. For that reason the side wall at 20 is made with a slightly larger outside diameter than the inside diameter of the teat cup so that a sealing contact is made by compression of the rubber inflation within the teat cup. This is in addition to the seal between the rim flap 15 and the outer surface of the teat cup, which are held in contact by tension as is usual with inflations of the one-piece type.

An increase in the efficiency of the seal at the bottom of the cup 11 is obtained by the addition of the wedge-shaped annular beads 28. The bead at 27 is compressed against the lower end of the nipple 13 by reason of the length of the body 10 being such as to require a slight stretching to pull the retaining bead 27 through the nipple 13. The beads 28, being wedge-shaped, present a narrow, easily compressed surface to the inner periphery of the nipple 13 and permit a tight sealing contact with the cup without making it too difficult to draw the bead 27 through the nipple 13.

While there is herein described, and in the drawings shown, an illustrative embodiment of the invention, it is to be understood that the invention, is not limited thereto, but may comprehend other constructions, arrangement of parts, details and features without departing from the spirit of the invention. We desire to be limited, therefore, only by the scope of the appended claims.

We claim:

1. An inflation for milking machines for use with a metal teat cup comprising a substantially cup-shaped, resilient rubber teat-receiving body adapted at the top for engagement about the teat of a cow and for sealed contact with the open end of the teat cup and having its lower end adapted for connection with a milk-receiving means under partial vacuum and for sealed contact with the lower end of said teat cup, characterized by said body having a flexible side wall formed with external thickening ribs extending longitudinally of said body with each rib progressively increasing in width from its upper end near the top of said body to a continuous thickened band at the bottom of said body, whereby said inflation is increasingly flexible from the bottom upward.

2. An inflation for milking machines for use with a metal teat cup comprising a substantially cup-shaped, resilient rubber teat-receiving body adapted at the top for engagement about the teat of a cow and having a rim flap at said top for sealing engagement with the open end of the teat cup and having its lower end adapted for connection with a milk-receiving means under partial vacuum and for sealed contact with the lower end of said teat cup, characterized by said body having a cup-contacting sidewall portion under said flap whose normal outside diameter is larger than the inside diameter of said teat cup for sealing engagement with said cup, and said body having a flexible sidewall formed with external thickening ribs extending longitudinally of said body with each rib progressively increasing in width from its upper end near the top of said body to a continuous thickened band at the bottom of said body, whereby said inflation is increasingly flexible from the bottom upward.

THEODORE W. HARRIS.
ROYAL B. INGERSOLL.

REFERENCES CITED

The following references are of record in the file of this patent:

UNITED STATES PATENTS

| Number | Name | Date |
|---|---|---|
| 1,195,572 | Fletcher | Aug. 22, 1916 |
| 1,285,097 | Eklundh et al. | Nov. 19, 1918 |
| 1,365,665 | Davies | Jan. 18, 1921 |
| 1,955,810 | Hodsdon | Apr. 24, 1934 |
| 2,055,718 | Davis | Sept. 29, 1936 |
| 2,302,443 | Hodsdon | Nov. 19, 1942 |
| 2,340,296 | Bender | Feb. 1, 1944 |